United States Patent
Veitch et al.

(10) Patent No.: US 10,808,755 B2
(45) Date of Patent: Oct. 20, 2020

(54) METHOD TO SEAL DAMPER CAVITY OF MULTI-FILM OIL DAMPER

(71) Applicant: PRATT & WHITNEY CANADA CORP., Longueuil (CA)

(72) Inventors: Thomas Veitch, Toronto (CA); David Beamish, Mississauga (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 0 days.

(21) Appl. No.: 16/291,384

(22) Filed: Mar. 4, 2019

(65) Prior Publication Data
US 2020/0284298 A1 Sep. 10, 2020

(51) Int. Cl.
| F16C 33/66 | (2006.01) |
| F01D 25/16 | (2006.01) |
| F01D 25/18 | (2006.01) |
| F16C 27/04 | (2006.01) |

(52) U.S. Cl.
CPC .......... F16C 27/045 (2013.01); F01D 25/162 (2013.01); F01D 25/18 (2013.01); F16C 33/6685 (2013.01); F05D 2220/32 (2013.01); F05D 2260/96 (2013.01); F16C 2360/23 (2013.01)

(58) Field of Classification Search
CPC .......... F16C 27/045; F16C 33/6685; F16C 2360/23; F01D 25/18; F01D 25/162; F01D 25/16; F01D 25/164; F05D 2220/32; F05D 2260/96; F16F 15/0237
See application file for complete search history.

(56) References Cited

U.S. PATENT DOCUMENTS

| 3,499,691 | A | 3/1970 | Baier |
| 4,214,796 | A | 7/1980 | Monzel et al. |
| 4,775,248 | A | 10/1988 | Barbic et al. |
| 4,992,024 | A | 2/1991 | Heydrich |
| 5,046,718 | A | 9/1991 | Hay, II |
| 8,342,796 | B2 | 1/2013 | Spencer et al. |
| 8,919,499 | B2 | 12/2014 | Delamour et al. |
| 9,841,056 | B2 | 12/2017 | Snow et al. |
| 9,890,810 | B2 | 2/2018 | Kawashita et al. |
| 2007/0086685 | A1* | 4/2007 | Klusman ............... F01D 25/125 384/99 |
| 2009/0263057 | A1 | 10/2009 | Kanki et al. |
| 2016/0138421 | A1* | 5/2016 | Duong .................... F16C 27/04 384/581 |

* cited by examiner

*Primary Examiner* — Alan B Waits
(74) *Attorney, Agent, or Firm* — Norton Rose Fulbright Canada LLP

(57) ABSTRACT

A multi-film oil damper suited for accommodating radial movement of a rotary shaft bearing relative to a bearing housing, the multi-film oil damper comprising: an annular damper cavity defined within the bearing housing between a radially outward wall and radially extending side walls; an inner damper ring; an outer damper ring disposed between the inner damper ring and the radially outward wall of the annular damper cavity; wherein the annular damper cavity has an oil inlet in communication with a source of pressurized oil; and wherein a radial thickness of the inner damper ring exceeds a radial thickness of the outer damper ring.

10 Claims, 4 Drawing Sheets

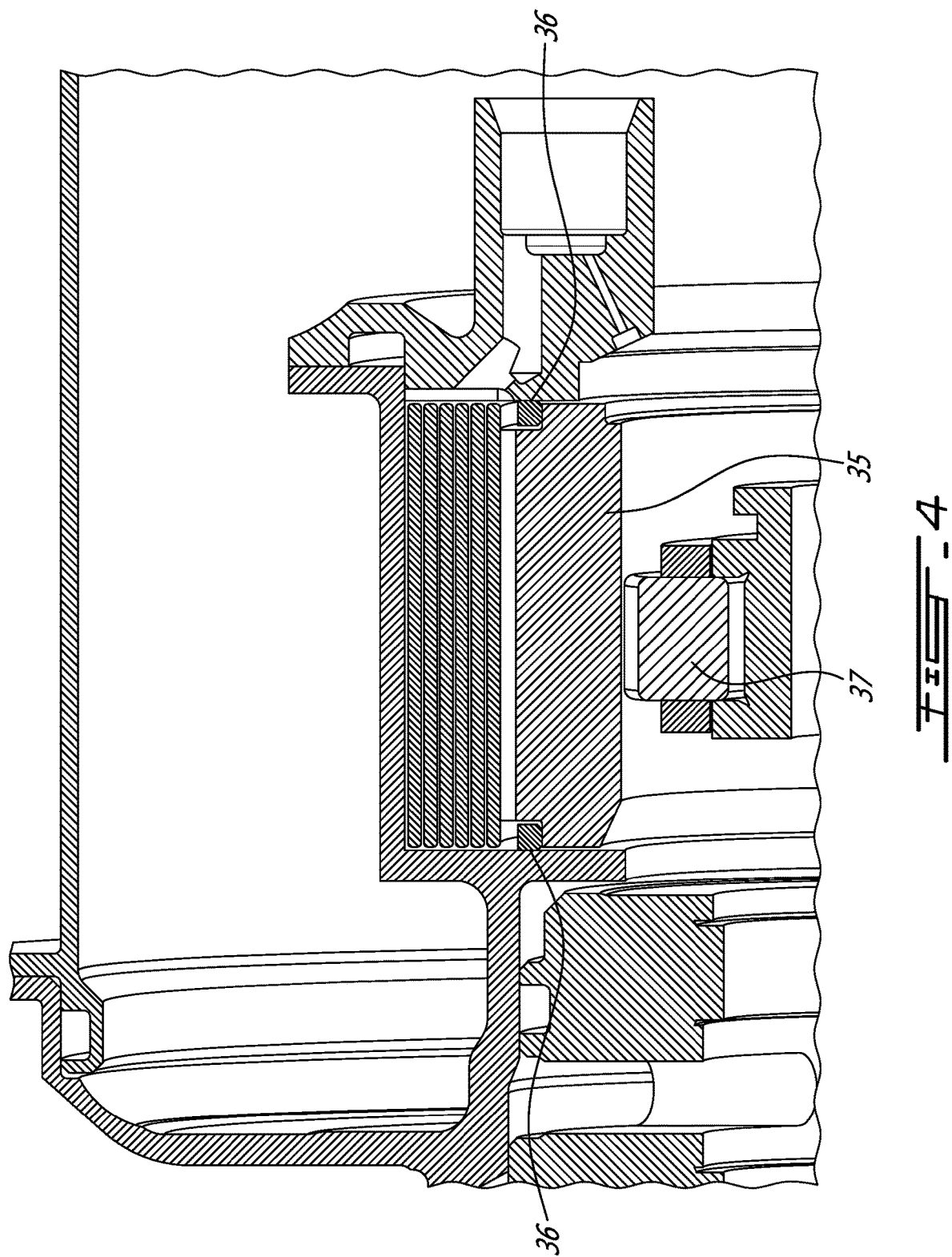

METHOD TO SEAL DAMPER CAVITY OF MULTI-FILM OIL DAMPER

TECHNICAL FIELD

The disclosure relates generally to multi-film bearing dampers in the bearing housing of an aircraft engine.

BACKGROUND

Squeeze film oil dampers with a single oil film are well known and used throughout the gas turbine and turbomachinery industry. Oil dampers are typically placed in series with the rotor system bearing supports and provide damping to a rotor system to reduce vibrations that would otherwise be present in the system. In some cases, such as high rotor imbalance, a large amount of radial damping movement is needed beyond the capacity of a single film and a multi-film damper can be used.

With multiple films, ensuring a robust seal to retain the oil film in the oil film cavity is necessary to prevent air entrainment or oil pressure loss, both of which are detrimental to the oil damper function. The interaction of the multiple oil films and the relatively large radial movement of the multiple film oil damper assembly as a whole presents oil sealing challenges. Improvement is desirable.

SUMMARY

In one aspect, the disclosure describes a multi-film oil damper, the multi-film oil damper comprising: an annular damper cavity defined within a bearing housing between a radially outward wall and radially extending side walls; an inner damper ring having axial ends; an outer damper ring disposed between the inner damper ring and the radially outward wall of the annular damper cavity, wherein a radial thickness of the inner damper ring exceeds a radial thickness of the outer damper ring.

In another aspect, the disclosure describes a gas turbine engine comprising: a floating rotary shaft bearing, a stationary bearing housing, and a multi-film oil damper disposed between the floating rotary shaft bearing and the stationary bearing housing, the multi-film oil damper comprising: an inner damper ring having axial ends adjacent to radially extending side walls of the stationary bearing housing; an outer damper ring disposed between the inner damper ring and a radially outward wall of the stationary bearing housing; an oil inlet in communication with a source of pressurized oil for providing an oil film coating on a radially outward surface of the inner damper ring and surrounding the outer damper ring; and wherein a radial thickness of the inner damper ring exceeds a radial thickness of the outer damper ring.

In another aspect, the disclosure describes a method of accommodating radial movement of a rotary shaft bearing relative to a bearing housing, using a multi-film oil damper having an inner damper ring surrounded by at least one outer damper ring in a damper cavity; the method comprising: filling the damper cavity with pressurized oil through an oil inlet in communication with a source of oil to thereby immerse the outer damper ring and providing an oil film coating on a radially outward surface of the inner damper ring; and wherein a radial thickness of the inner damper ring exceeds a radial thickness of the outer damper ring.

Further details of these and other aspects of the subject matter of this application will be apparent from the detailed description included below and the drawings.

DESCRIPTION OF THE DRAWINGS

FIG. 4 is an axial cross-section view through a multiple oil film damper in accordance with a second embodiment of the present description where the bearing outer race also serves as the thicker inner ring of the oil damper and has oil seals at each axial end.

DETAILED DESCRIPTION

Figure 1:
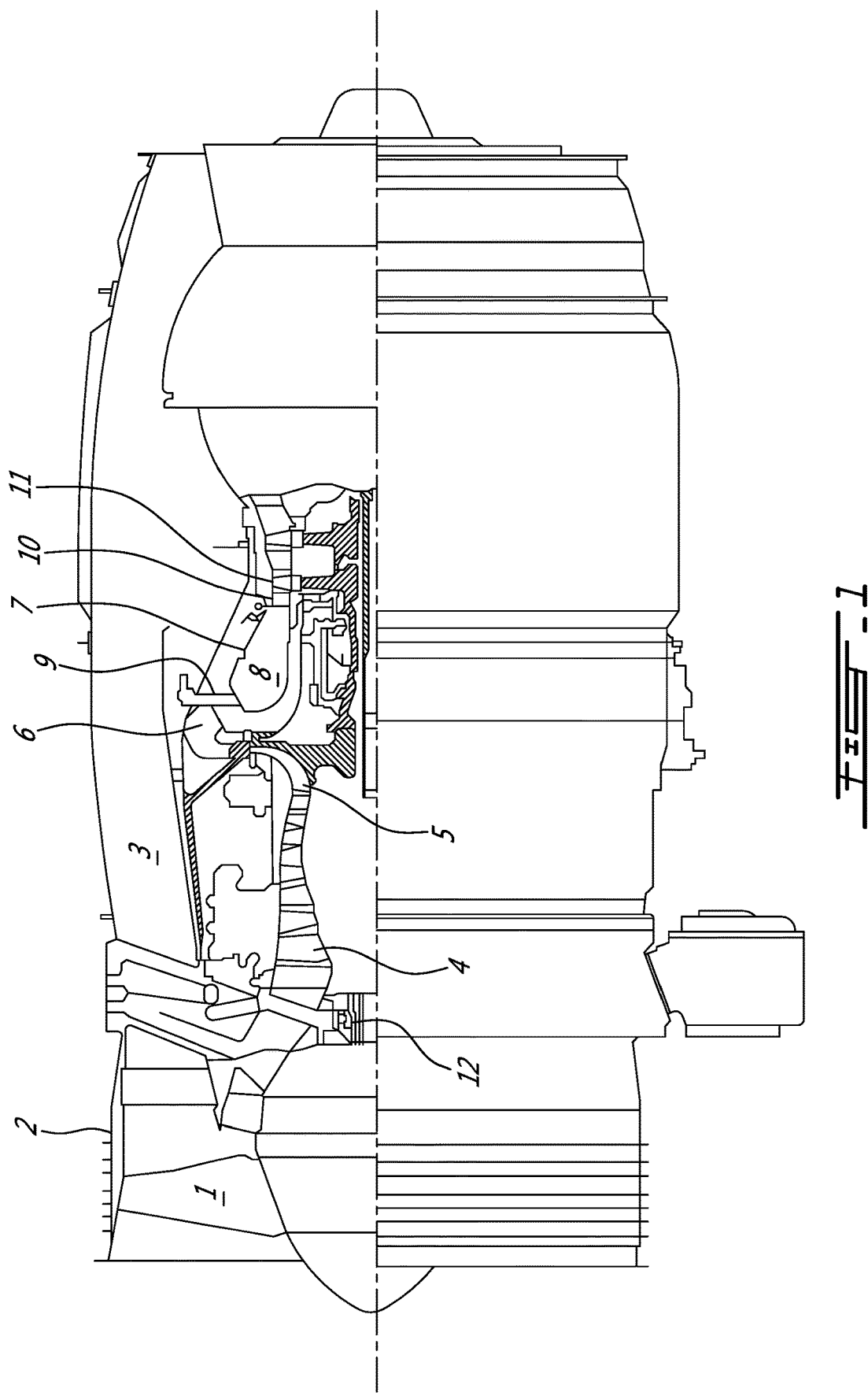
FIG. 1 shows an axial cross-section view of an example turbo-fan gas turbine engine.

FIG. 1 shows an axial cross-section through an example turbo-fan gas turbine engine. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor 5 through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust.

Figure 2:
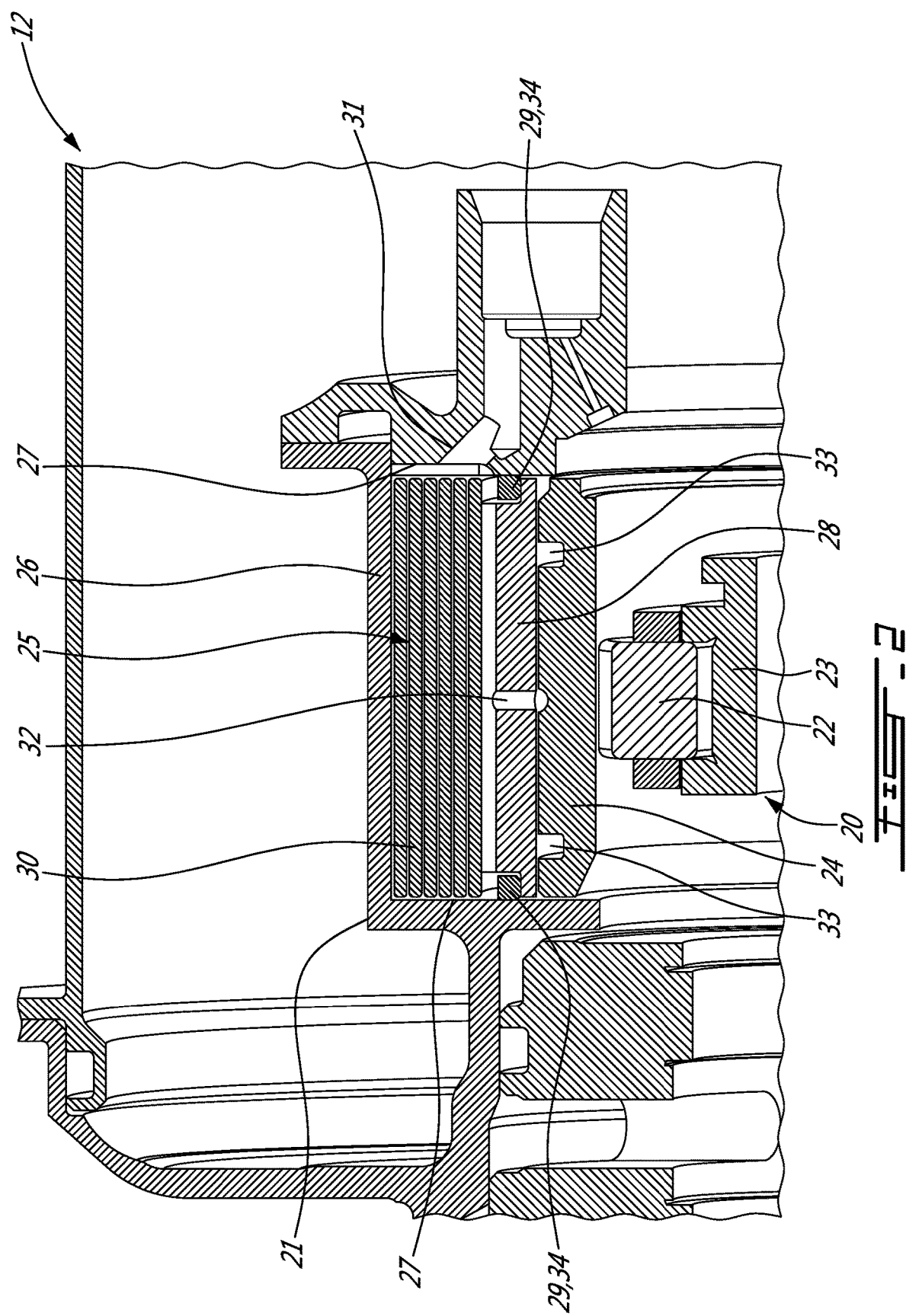
FIG. 2 is an axial cross-section view through a multiple oil film damper in accordance with a first embodiment of the present description having a thicker inner ring with axial end seals and six thinner outer rings.

FIG. 1 shows a forward bearing housing 12 that supports the low pressure spool shaft with roller bearings. As shown in FIG. 2, the bearing housing 12 may house a multi-film oil damper.

More particularly, FIG. 2 is an axial cross-section view through an exemplary multiple oil film damper in accordance with a first embodiment of the present description. The multi-film oil damper accommodates radial movement of the bearing 20 relative to the bearing housing 21. The bearing 20 includes roller bearings 22, the inner race 23 and outer race 24. Within the bearing housing 21 an annular damper cavity 25 is defined between a radially outward wall 26 and two radially extending side walls 27.

In the first embodiment shown in FIG. 2, radially outward of the outer race 24 of the bearing 20 is an inner damper ring 28. The axial ends 29 of the inner damper ring 28 abut the radially extending side walls 27 of the annular damper cavity 25. In the embodiment shown, six outer damper rings 30 are disposed between the inner damper ring 28 and the radially outward wall 26 of the annular damper cavity 25. A single outer damper ring 30 or any number of multiple outer damper rings 30 can be used depending on the amount of radial motion required and the number of oil films desired.

The annular damper cavity 25 has an oil inlet 31 in a side wall 27 which is communication with a source of pressurized oil. The oil fills the annular damper cavity 25 immersing the outer damper rings 30 and coating all surfaces of the outer damper rings 30 in an oil film. The oil also provides an oil film coating on the radially outward surface of the inner damper ring 28.

In the embodiment shown in FIG. 2, the inner damper ring 28 has a radially inward surface abutting the outer race 24 of the rotary shaft bearing 20. The inner damper ring 28 has a radial oil passage 32 for providing an oil film coating between the radially inward surface of the inner damper ring 28 and the outer race 24 of the rotary shaft bearing 20. To contain the oil, between a radially inward surface of the inner damper ring 28 and the outer race 24, is a pair of piston rings 33. Therefore the embodiment shown in FIG. 3 produces eight oil film layers (i.e: a layer on each side of the inner damper ring 28 and a layer radially outward of each of the six outer damper rings 30).

Figure 3:
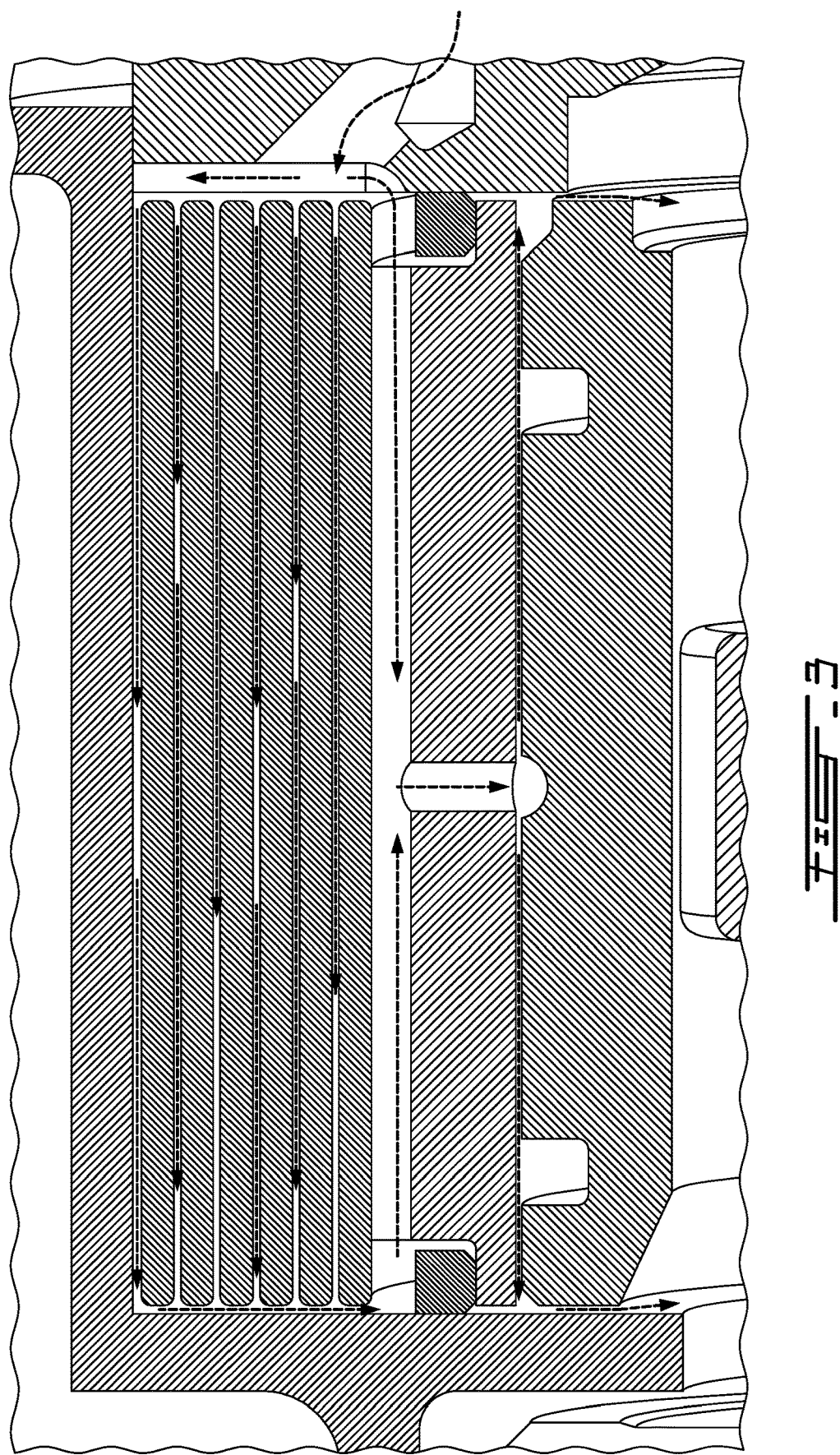
FIG. 3 is a detail view of the oil damper of FIG. 2.

The radial thickness of the inner damper ring 28 exceeds the radial thickness of the outer damper rings 30. The larger thickness provides a surface on the axial ends 29 of the inner damper ring 28 to mount oil retention seals 34. The larger thickness also aids in distributing the load from the bearing 20 to the thinner and more flexible outer damper rings 30. The oil retention seals 34 slidingly engage the radially extending side walls 27 of the annular damper cavity 25 as the inner damper ring 28 moves radially. FIG. 3 shows a detail sectional view of the first embodiment (FIG. 2) and indicates a potential direction of oil flow with arrows.

FIG. 4 shows a second embodiment where the inner damper ring 35 serves a dual function. The inner damper ring 35 provides a mounting surface on the axial ends for the oil retention seals 36 and has a radially inner surface that engages the roller bearings 37 to also serve as the outer race of the rotary shaft bearing.

Referring to FIG. 2, the thicker inner damper ring 28 with oil seals 34 at each axial end 29 serves to prevent the flow of oil out of the annular damper cavity 25. The seals 34 could be either metallic piston seals, o-ring type seals or energized seals. Placement of the radially sliding seal 34 at the axial ends of the innermost damper ring 28, allows significant radial movement of the damper assembly while maintaining contact with the radially extending side walls 27 of the annular damper cavity 25. Further, with oil seals 34 located on the innermost damper ring 28, oil is free to flow throughout the rest of the oil damper cavity 25 to allow pressurization of the oil films surrounding the outer damper ring or rings 30 that are housed in the annular damper cavity 25.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A multi-film oil damper for a rotary shaft bearing, the multi-film oil damper comprising:
   an annular damper cavity defined within a bearing housing between a radially outward wall and radially extending side walls;
   a plurality of damper rings axially nested within the annular damper cavity between the radially extending side walls, the plurality of damper rings including an inner damper ring having axial ends and at least one outer damper ring disposed radially between the inner damper ring and the radially outward wall of the annular damper cavity, the inner damper ring having a radially inward surface surrounding an outer race of the rotary shaft bearing, the inner damper ring having a radial oil passage for providing an oil film coating between the radially inward surface of the inner damper ring and the outer race of the rotary shaft bearing;
   wherein a radial thickness of the inner damper ring exceeds a radial thickness of the at least one outer damper ring, the axial ends of the inner damper ring facing the radially extending side walls of the annular damper cavity and carrying axial seals in sealing and sliding engagement with the radially extending side walls of the annular damper cavity.

2. The multi-film oil damper according to claim 1 wherein the at least one outer damper ring includes a plurality of outer damper rings each being immersed in oil within the annular damper cavity.

3. The multi-film oil damper according to claim 2 wherein the plurality of outer damper rings individually have a radial thickness less than that of the inner damper ring.

4. The multi-film oil damper according to claim 1, further comprising a pair of piston rings between the inner damper ring and the outer race of the rotary shaft bearing, the piston rings disposed axially between, the axial seals.

5. The multi-film oil damper according to claim 1 comprising an oil inlet in communication with a source of pressurized oil for providing an oil film coating on a radially outward surface of the inner damper ring and surrounding the at least one outer damper ring, wherein the oil inlet is disposed in at least one of the radially extending side walls of the annular damper cavity.

6. A gas turbine engine comprising: a floating rotary shaft bearing, a stationary bearing housing, and a multi-film oil damper disposed between the floating rotary shaft bearing and the stationary bearing housing, the multi-film oil damper comprising:
   an annular damper cavity defined within the stationary bearing housing between a radially outward wall and radially extending side walls;
   a plurality of damper rings nested within the annular damper cavity axially between the radially extending side walls, the plurality of damper rings including an inner damper ring having axial ends adjacent to the radially extending side walls of the annular damper cavity, and at least one outer damper ring disposed between the inner damper ring and a radially outward wall of the stationary bearing housing, the inner damper ring having a radially inward surface surrounding an outer race of the floating rotary shaft bearing; and
   an oil inlet in communication with a source of pressurized oil for providing an oil film coating on a radially outward surface of the inner damper ring and surrounding the at least one outer damper ring;
   wherein a radial thickness of the inner damper ring exceeds a radial thickness of the at least one outer damper ring, the axial ends of the inner damper ring facing the radially extending side walls of the annular damper cavity and carrying axial seals in sealing and sliding engagement with the radially extending side walls of the annular damper cavity.

7. A method of accommodating radial movement of a rotary shaft bearing relative to a bearing housing, using a multi-film oil damper having an inner damper ring surrounded by at least one outer damper ring in a damper cavity, the inner damper ring surrounding an outer race of the rotary shaft bearing; the method comprising:

filling the damper cavity with pressurized oil through an oil inlet in communication with a source of oil to thereby immerse the at least one outer damper ring and providing an oil film coating on a radially outward surface of the inner damper ring; and wherein a radial thickness of the inner damper ring exceeds a radial thickness of the outer damper ring, the inner damper ring carrying axial seals for sealing and sliding engagement with radially extending side walls of the damper cavity.

8. The method according to claim 7 comprising providing a plurality of outer damper rings each immersed in oil within the annular damper cavity.

9. The method according to claim 7 comprising providing the inner damper ring with a radially inward surface abutting the outer race of the rotary shaft bearing, and providing an oil film coating between the radially inward surface of the inner damper ring and the outer race of the rotary shaft bearing using oil injected via the oil inlet.

10. The method according to claim 9 comprising providing an innermost oil film defined by a pair of piston rings between a radially inward surface of the inner damper ring and the outer race of the rotary shaft bearing.

* * * * *